(12) United States Patent
Alloing et al.

(10) Patent No.: US 7,032,210 B2
(45) Date of Patent: Apr. 18, 2006

(54) METHOD AND SYSTEM FOR GENERATING PROGRAM SOURCE CODE OF A COMPUTER APPLICATION FROM AN INFORMATION MODEL

(75) Inventors: Francois Alloing, Etampes (FR); Marie Foucher, Fontainebleau (FR); Xavier Macquet, Fontenay-aux-Roses (FR)

(73) Assignee: International Business Machines Corporation, Armonk, NY (US)

( * ) Notice: Subject to any disclaimer, the term of this patent is extended or adjusted under 35 U.S.C. 154(b) by 622 days.

(21) Appl. No.: 10/138,892

(22) Filed: May 2, 2002

(65) Prior Publication Data

US 2003/0110472 A1    Jun. 12, 2003

(30) Foreign Application Priority Data

Nov. 13, 2001  (EP) .................................. 01480113

(51) Int. Cl.
*G06F 9/44*    (2006.01)
(52) U.S. Cl. ...................................... 717/106
(58) Field of Classification Search ................ 717/106, 717/108, 147, 105, 109
See application file for complete search history.

(56) References Cited

U.S. PATENT DOCUMENTS

2002/0032900 A1 * 3/2002 Charisius et al. ........... 717/106

OTHER PUBLICATIONS

"Easy Java/XML integration with JDOM, Part 1", 05, 2000, by Jason Hunter and Brett Mclaughlin, http://www.javaworld.com/javaworld/jw-05-2000/jw-0518-jdom.html.*

* cited by examiner

*Primary Examiner*—Tuan Dam
*Assistant Examiner*—Chih-Ching Chow
(74) *Attorney, Agent, or Firm*—Stephen J. Walder, Jr.; Jeffrey S. LaBaw

(57) ABSTRACT

A method for generating program source code of a computer application from an information model representing a high level specification of the computer application, comprises a step of inserting reconciliation annotations in the program source code, the reconciliation annotations representing a modification rule and a modification state for each language element contained in the generated source code. Then, upon receiving a current version of the program source code, the current version resulting from the modification by a user of an old generated version of the program source code, and a new generated version of the program source code, the new version reflecting changes in the application information model, a step of reconciling the current version with the new version of the program source code according to the reconciliation annotations inserted in each of the current and new program source code versions, and a step of generating a reconciled version of the program source code are performed.

28 Claims, 6 Drawing Sheets

METHOD AND SYSTEM FOR GENERATING PROGRAM SOURCE CODE OF A COMPUTER APPLICATION FROM AN INFORMATION MODEL

TECHNICAL FIELD

The present invention relates generally to the generation of program source code of a computer application, from an information model representing a high level specification of the computer application. More particularly, the invention relates to the reconciliation of two different versions of the program source code.

The invention also concerns a computer system for carrying out such a code generation method.

BACKGROUND OF THE INVENTION

With the development of the Internet, and in particular with the development of the electronic business ("the e-business") over the World Wide Web ("the Web"), tools for software application development have appeared which allow simplified building and deployment of data management or e-business applications.

These new development tools also allow developers with little or no programming language expertise to implement end-to-end business system in a given programming language, and also enable developers to implement systems running on traditional transactional platforms, such as CICS or IMS, and accessing legacy data with no need to become mainframe experts.

For example, such application development tools automate the development of business applications by generating application components from existing database definitions. These definitions populate an Information Model which allow the user to formalise high-level specifications via its dedicated entities and to produce a complete operational client/server application.

This software application is produced in the form of source code, that is, a group of statements written in a programming language. Examples of programming languages are, C, C++, Java™, etc. Before the source code can be executed, the statements within the source code must be transformed to object code.

However with this type of software development tool, if a current version of the source code is subsequently modified by a user, for example through a programming language file editor, facilities are not provided for automatically reconciling a modified current version of the source code with a new generated version of the source code which reflects changes in the application information model. The reconciliation process, typically performed "manually", updates the new source code version based on the modifications made in the current source code version.

Such a "manual" reconciliation process is prone to errors and is also time-consuming.

SUMMARY OF THE INVENTION

It is therefore an object of the present invention to overcome the above-mentioned shortcomings of such a manual reconciliation process.

To that end, the invention provides, according to a first aspect, a method in a computer system for generating program source code of a computer application from an information model representing a high level specification of the computer application. The method comprises the computer-implemented steps of:

inserting reconciliation annotations in the program source code, the reconciliation annotations representing at least a modification rule and a modification state for each language element contained in the generated source code; and upon receiving a current version of the program source code, the current version resulting from the modification by a user of an old generated version of the program source code, and a new generated version of the program source code, the new version reflecting changes in the application information model:

reconciling the current version with the new version of the program source code according to the reconciliation annotations inserted in each of the current and new program source code versions; and generating a reconciled version of the program source code.

In this way, user modifications in an old version of the program source code and subsequent changes in the application information model are automatically consolidated in a reconciled version of the program source code.

According to one advantageous characteristic of the invention, each of the program source code versions is represented by a program tree in a memory of the computer system, the program tree being a tree data structure having nodes, each node representing a language element of the program source code.

In this way, the representation of a language element by a tree node facilitates the association of reconciliation annotations with the language element and allows the assignment of reconciliation annotations to all the language elements of the program source code. Furthermore, a tree of nodes makes the processing of the reconciliation annotations easier.

According to a preferred implementation of the invention, a given program source code is expressed in Java™ programming language and the corresponding program tree is structured according to the JDOM (Java Document Object Model) standardised format.

In this way, the processing of Java source code elements is performed through a standard set of objects representing the elements, a standard model of how these objects can be combined, and a standard interface for accessing and manipulating them.

According to another characteristic of the invention, the step of inserting reconciliation annotations in a generated program source code comprises the step of creating in the program source code, for each node of the program tree representing the program source code, a program construct having a plurality of data fields, said plurality of data fields including:

a node identification field containing a node identifier for identifying the semantic type and the name of the source code language element corresponding to the node;

a modification rule identification field for containing an identifier of the modification rule applicable to the corresponding language element; and a modification state identification field for containing an identifier indicative of the modification state of the corresponding language element.

According to a further characteristic of the invention, the reconciliation step between the current version and the new version of the program source code, comprises the sub-steps of:

for each node (current node) of the current version tree, reading the reconciliation annotations of the current node and those of the corresponding node (new node), if it exists, of the new version tree; and determining a reconciled node according to the modification state of the current node and either to the modification rule of the corresponding new node, if it exists, or otherwise, to the modification rule of the current node.

In this way, the reconciliation procedure is performed on a "node-wise" basis for each tree node of the new source code version, and a "reconciled" node is determined based on the reconciliation information associated with the new node and with the corresponding current node which are under consideration.

According to a second aspect, the invention relates to a computer system for generating program source code of a computer application by carrying out a method as briefly set out above. According to the invention, the computer system comprises:

insertion means for inserting reconciliation annotations in the program source code during the generation process, the reconciliation annotations representing at least a modification rule and a modification state for each language element contained in the generated source code; and a reconciliation component including:

means for receiving a current version of the program source code, the current version resulting from the modification by a user of an old generated version of the program source code, and a new generated version of the program source code, the new version reflecting changes in the application information model;

means for reconciling the current version with the new version of the program source code according to the reconciliation annotations inserted in each of the current and new program source code versions; and means for generating a reconciled version of the program source code.

The invention also provides a computer program on an information carrier, the program comprising program instructions adapted to implement a method as briefly set out above when the computer program is loaded and executed in a computer.

The invention also concerns an information carrier such as, for example, a compact disk or a diskette, this information carrier containing a computer program as defined above.

The advantages of this computer system, computer program and of this information carrier, are identical to those of the method as briefly set out above.

Other features and advantages of the invention will emerge further from the description below.

BRIEF DESCRIPTION OF THE DRAWINGS

In the accompanying drawings, given by way of non-limiting examples.

DETAILED DESCRIPTION OF THE INVENTION

Figure 1:
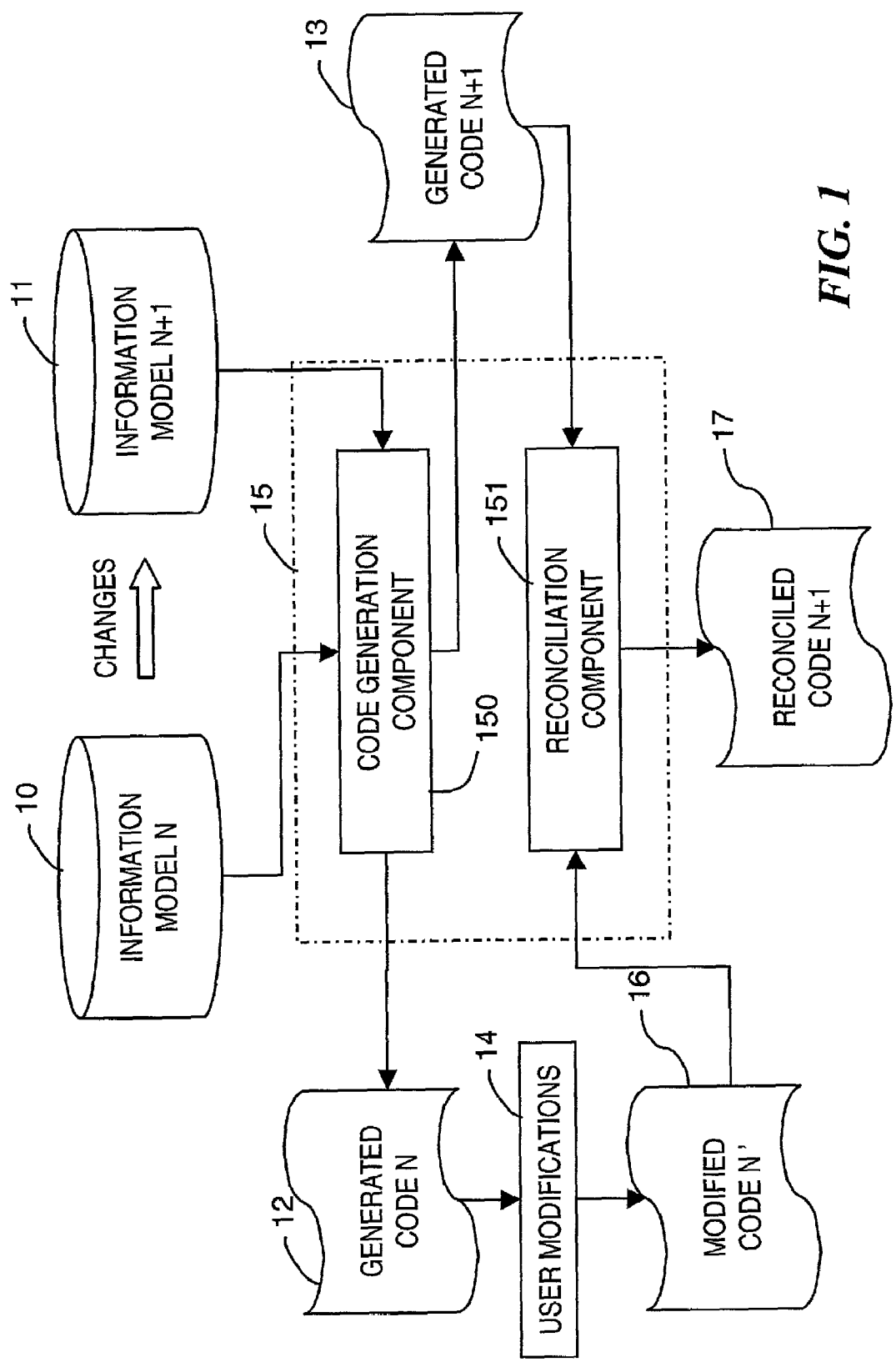
FIG. 1 is a diagram illustrating a general context of software code generation to which applies the invention.

A description will now be given with reference to FIG. 1 of a diagram illustrating a general context of software code generation to which applies the invention. As represented in FIG. 1, a system 15 for generating program source code in accordance with the invention, comprises a code generation component 150 and a reconciliation component 151.

The object of the generation component 150 is to generate program source code of a software application which is defined through a high level specification forming an information model. Information model "N" designates a first information model of the application under consideration, while information model "N+1" designates a subsequent information model (version N+1) of the same software application incorporating changes made to the model version N. The software application is herein denoted "target application".

Similarly, source code N (12) has been generated from information model N (10) and constitutes an "old" generated version of the target application source code. In the same way, source code N+1 (13) has been generated from information model N+1 and accordingly constitutes a "new" generated version of the target application source code.

According to the invention, code generation component 150 includes means for inserting reconciliation annotations in each version of program source code generated during the code generation process.

In accordance with the invention, the said reconciliation annotations represent in particular a modification rule and a modification state for each language element contained in the generated source code. The insertion means as well as the reconciliation annotations will be further detailed, later in the description.

As further shown in FIG. 1, the old generated source code 12 has been subsequently modified by a user through process 14 so as to provide a modified source code N' (16) herein denoted "current" version of the target application source code.

Typically, the user modification process is performed through a graphical user interface (GUI) such as an edition software tool specific to the programming language of the source code, the source code being displayed on a computer display screen in the form of text or through a graphical tree representation. Source code modifications are therefore brought "manually" by the user, that is, entered through an input device such as a keyboard.

In accordance with the invention, reconciliation component 151 is adapted to receive simultaneously such a current version 16 of the program source code and the new generated version 13 of the program source code, and includes means for reconciling the current version with the new version of the program source code. The reconciliation process is performed according to the reconciliation annotations inserted in each of the current and new program source code versions.

As a result of the reconciliation process, reconciliation component 151 generates a reconciled version 17 of the source code N+1.

In this way, user modifications brought to the old version 12 of the source code N which corresponds to information model N (10), and changes made to information model N (10) resulting in the creation of new model N+1 (11), are automatically consolidated in reconciled source code version N+1 (17).

Figure 2:
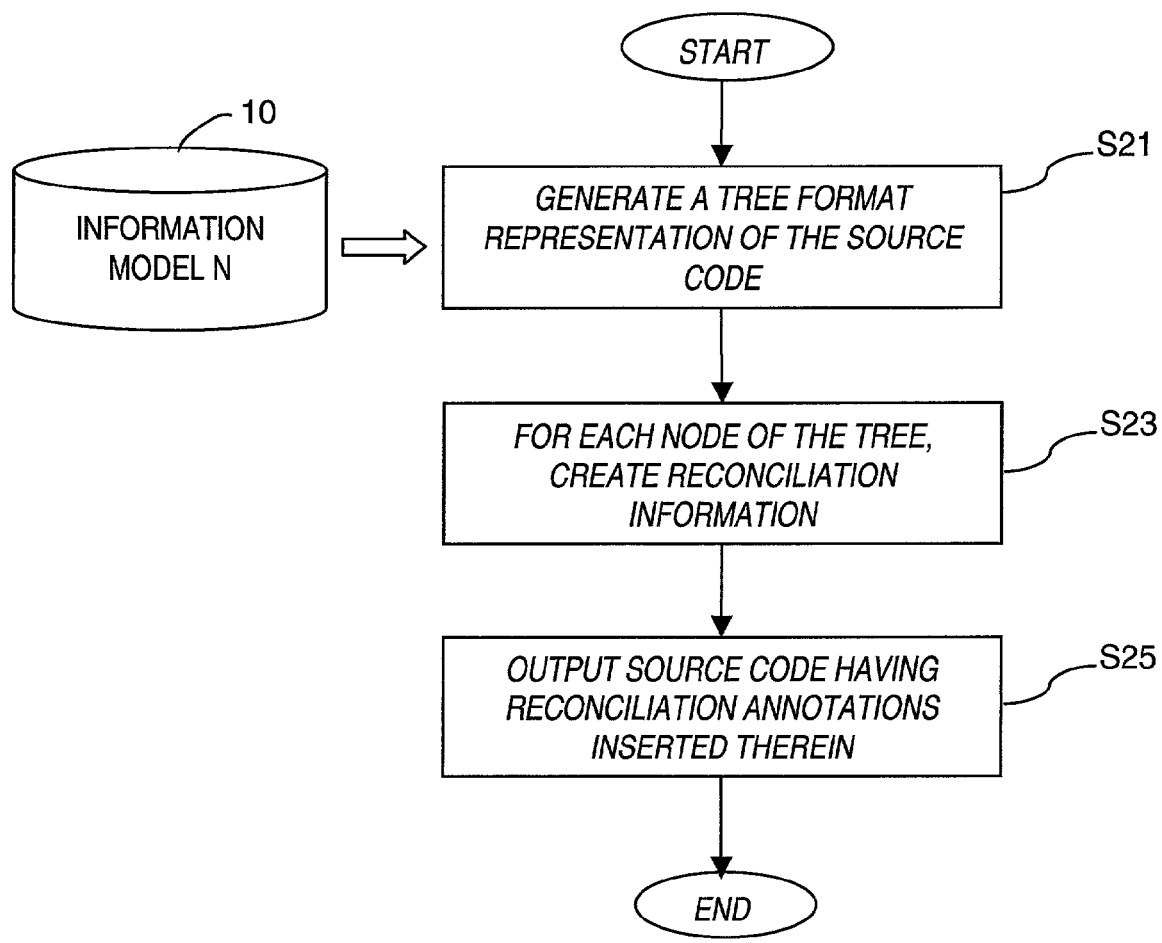
FIG. 2 illustrates a global procedure of program source code generation according to the invention.

FIG. 2 illustrates a global procedure of program source code generation according to the invention.

As shown in FIG. 2, an information model 10 is input to the code generation component (150) which generates, at step S21, the corresponding source code represented in a tree format. That is to say, the source code is represented in a memory of a computer, typically in a RAM memory, by a program tree which is a tree data structure having nodes, each of which representing a language element of the program source code.

In a preferred implementation of the invention, the source code is expressed in Java programming language. In this implementation, the program tree is structured according to the JDOM (Java Document Object Model) standardised format.

The JDOM model is a programmatic high level interface that allows programs to dynamically access and update the content and structure of standard Java source code documents (".java" files). JDOM is inspired by DOM (Document Object Model), which was originally designed to provide the same kind of functionality for XML (eXtended Markup Language) and HTML (HyperText Markup Language) documents. Thus, JDOM provides a standard set of objects for representing Java source code, a standard model of how these objects can be combined, and a standard interface for accessing and manipulating them. The JDOM closely resembles the structure of the Java program source it models.

For instance, considering the following simple Java program:

EXAMPLE 1

```
package p;
import java.lang.*;
/* My first program. */
class HelloWord extends Object {
    public static void main(String[ ] args) {
        System.out.println("Hello world") ;
        System.exit(0) ; //bye
    }
}
```

The corresponding JDOM tree representation would have the following structure:

Root-Node: CompilationUnitElement
Node1: PackageElement name="p"
Node2: ImportElement name="java.lang", onDemand="true"
Node3: CommentElement; /* My first program. */

-continued

Node4: ClassElement name="Helloworld", modifiers=0,
    SuperclassName="Object", superinterfaceNames=[ ]
    Node4-1: MethodElement name="main", modifiers=9, returnType="V",
        exceptionTypes=[ ]
        Node4-1-1: ParameterElement name="args", modifiers=0,
            type=" [Qstring; "
        Node4-1-2: CodeElement
            System.out.println( "Hello world" ) ;
            System.exit (0) ; // bye In the JDOM model, a Java compilation unit (i.e. the contents of a single ".java" source file) is represented as a tree of elements. There are elements for each of the major Java language constructs in the program including package, import, class, interface, method, constructor, and field declarations. JDOM presents the bodies of methods as code elements; each code element consists of Java source code statements (and comments) in textual form (multiple statements are generally treated as a single code element).

According to another implementation of the invention, the program source code generated is expressed in XML or HTML, and the internal tree representation therefore complies with the DOM standardised format.

Returning to FIG. 2, at step S23 there is created, for each node of the program tree under consideration, reconciliation information which is associated with the node. This reconciliation information is intended to be used for reconciling a current version of source code with a new version of source code as defined above (cf. FIG. 1 and associated description).

At the following step S25, reconciliation information is converted into reconciliation annotations expressed in the programming language used (e.g. Java) when the generated program source code is output.

The global procedure of program source code generation is then complete.

According to the invention, the reconciliation annotations which are inserted in the generated program source code represents in particular a modification rule and a modification state for each language element contained in the generated source code.

It is to be noted that the modification rule and the modification state is herein also referred to as, respectively, "update rule" and "update state".

More specifically, for each node of the program tree representing the program source code, there is created a program construct having a plurality of data fields which include:

a node identification field which contains a node identifier to identify the semantic type and the name of the source code language element corresponding to the tree node;

a modification rule identification field which contains an identifier of the modification rule applicable to the corresponding language element;

a modification state identification field which contains an identifier indicative of the modification state of the corresponding language element;

a model entity identification field which contains an identifier of an entity of the information model on which depends the corresponding language element, the entity identifier being invariable all through the code generation process; and a model entity name identification field which contains the name of the information model entity on which depends the corresponding language element.

The model entity and identification fields are used in conjunction with a predefined renaming rule in order to implement a renaming procedure. The renaming rule is not annotated in a generated source code, instead it is coded internally in the generation component (150) in association with the information model entities.

The renaming procedure will be set out later in the description in relation to FIG. 4.

As shown in the simple Java program example given hereinafter, when the language used is Java, the program construct which has a plurality of fields containing the reconciliation information is implemented as a specific Java method. In the example given, the reconciliation annotations are provided through the Java method "reconciliationInfos( )".

EXAMPLE 2 (SOURCE CODE N)

```
package java.lang.io;
import java.lang.*;
public class Customer {
    private String name;
    public void setName(String sName) {
        name = sName;
    };
    public String getName( ) {
        return name;
    };
    // each language element is annotated within 5 fields:
    //    "nodeIdentifier",   "inputID",   "inputName",
    "modificationRule",
    //    "modificationState"
    public static String[ ] [ ] reconciliationInfos( ) {
        String[ ] [ ] result = {
            {"TYPE::Customer", "ID1", "Customer", "NUD", "UNMODIFIED"},
            {"PACKAGE_DECLARATION::java.lang.io", "ID10", "", "NUD",
                "UNMODIFIED"},
            {"IMPORT_CONTAINER::java.lang.*", "ID11", "", "NUD", "UNMODIFIED"
            },
            {"FIELD::name", "ID100", "name", "NUD", "UNMODIFIED"},
            {"METHOD::setName(String)void", "ID100", "name", "ND", "UNMODIFIED"
            },
            {"METHOD::getName( )String", "ID100", "name", "ND", "UNMODIFIED
            "},
        };
        return result;
    }
}
```

In the above example, the source code shown has been generated from an application information model containing the description of a model entity named "Customer" which includes a field "name".

In the generated source code, a corresponding Java class "Customer" is obtained containing an attribute "name", a setter-type method "setName", and a getter-type method "getName".

The reconciliation annotations associated with this code source portion concern all the language elements: "Customer", "java.lang.io", "java.lang.*", "name", "setName", "getName".

Thus, in this example, the annotations associated with the Java language element "setName" are as follows:

the node identification field, herein referred to as "nodeIdentifier", contains the character string "METHOD::setName(String)void";

the model entity identification field, herein referred to as "inputID", contains the string "ID100";

the model entity name identification field, herein referred to as "inputName", contains the string "name";

the modification rule identification field, herein referred to as "modificationRule", contains the string "ND";

the modification state identification field, herein referred to as "modificationState", contains the string "UNMODIFIED".

Modification Rule

According to a preferred implementation of the invention, the modification rule which is identified by the value of the modification rule identification field (modificationRule), has one of the following meanings:

the language element to which it applies is not allowed to be modified (Not Updateable-NU);

the language element to which it applies is not allowed to be deleted (Not Deleteable-ND);

the language element to which it applies is not allowed to be modified nor deleted (Not Updateable nor Deleteable—NUD); and the language element to which it applies can be modified or deleted (Updateable or Deleteable-UD).

Modification State

According to a preferred implementation of the invention, the modification state identified by the value of the modification state identification field, has one of the following meanings:

the language element to which it applies has not been modified (Unmodified);

the language element to which it applies has been modified (Modified); and the language program element to which it applies has been deleted (Deleted).

Figure 3:
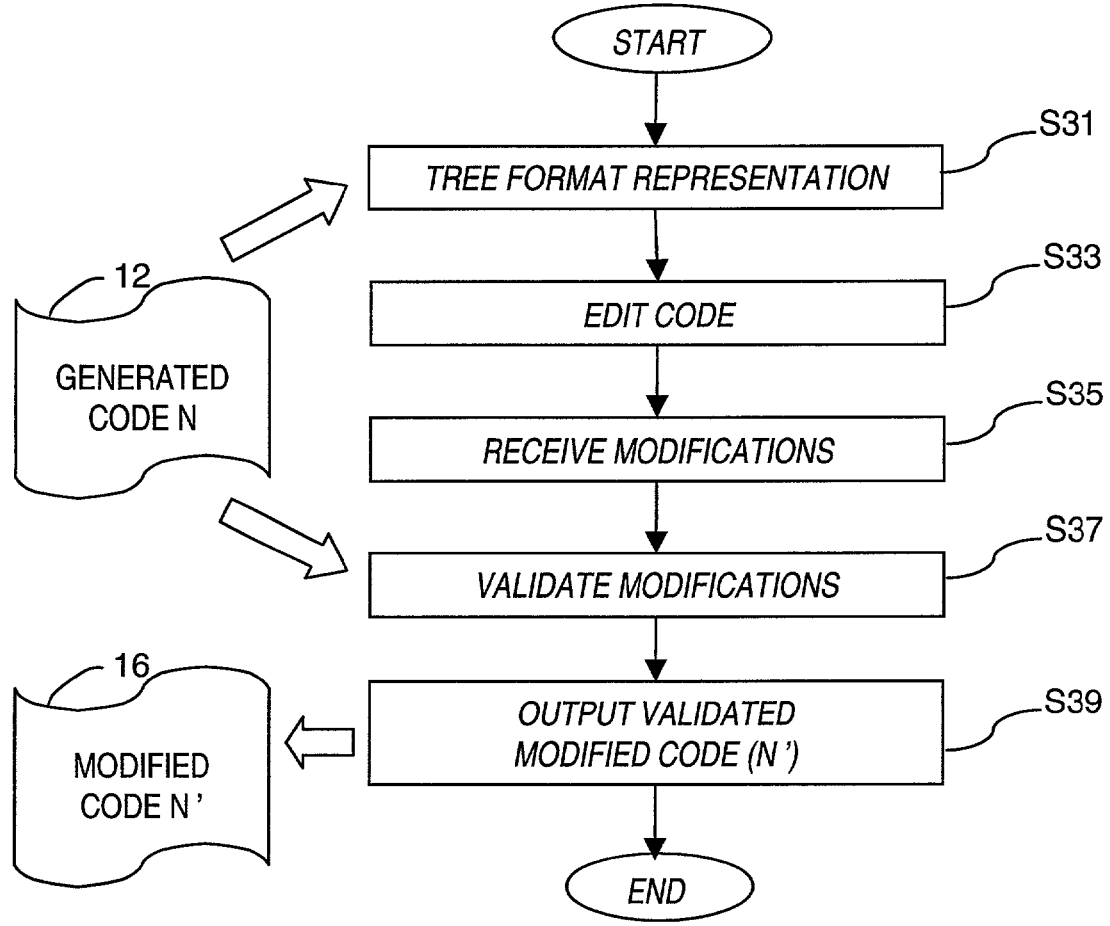
FIG. 3 is a flow chart illustrating a procedure for validating modifications made to a program source code version, in accordance with the invention.

With reference to FIG. 3, a validation procedure of modifications made to a program source code version will be described, in accordance with the invention.

A previously generated source code N (12) is input, as a Java compilation unit (.java file), in a Java editor software which firstly, at step S31, converts the source code into an internal generic tree representation, for example DOM representation, and then displays the source code on a computer display screen, at step S33.

The source code is displayed either directly in text format, or in a graphic format, for example a tree graphic representation. Then, at step S35, a user enters, for example via a keyboard, modifications brought to some language elements of the source code.

The source code editor software includes a validation component which is activated, at step S37, for example, when the user confirms the changes or triggers a save of the changes that he has entered.

To that end, the validation component receives as inputs both the original source code N (12), that is, the "old" generated source code, and the modified old source code, now constituting the "current" version.

According to the invention, the validation step (S37) includes, for each modification found in the current version, firstly the operation of reading the modification rule annotation from the old version, which corresponds to the same tree node. Then, any modification in the current version that violates the corresponding modification rule in the old version, is cancelled. Otherwise, the modification is allowed and the reconciliation annotations contained in the current version, in particular the modification state annotation, are updated accordingly.

Finally, at step S39, the validated current source code N' (16) is output, either as a Java file (Java compilation unit) or as a tree representation stored in the computer memory for further internal use, for example within the reconciliation component (151) in order to be reconciled with a new generated version of the source code.

Figure 4:
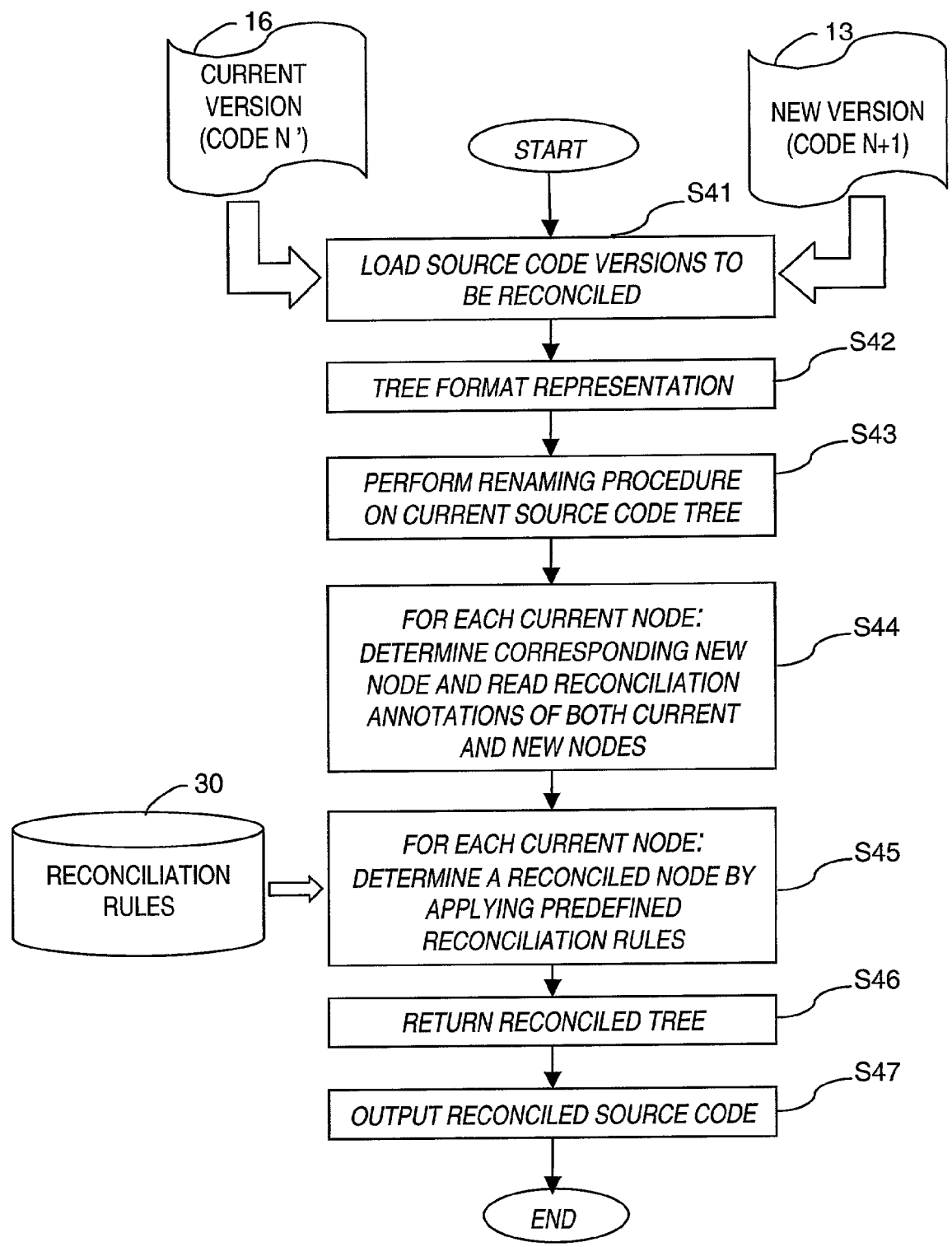
FIG. 4 is a flow chart illustrating a reconciliation procedure according to a preferred embodiment of the invention.

With reference to FIG. 4, there will now be described a reconciliation procedure according to a preferred embodiment of the invention. The reconciliation procedure is performed within the reconciliation component 151 of a source code generation system according to the invention, which will be further described in relation to FIG. 5.

At step S41 of FIG. 4, a current version 16 of the source code, originally generated from an information model N and subsequently modified (N') and validated as set out above (FIG. 3), and a new version 13 of the source code generated from a new information model N+1, are loaded into the reconciliation component 151.

Each of these two versions of the source code are either already internally represented in a tree structure format, or in a Java source code format (.java file). For example, new code version 13 may be input directly from generation component 150 in which case it is already in a tree format (DOM), while current code version 16 may be input from a Java editor in a Java textual form.

If a code version is input in a source code textual form (e.g. a ".java" file), then it is converted (step S42) into a program tree stored in the computer system memory (e.g. RAM). The tree format used at this stage, is a generic DOM format, which is independent of the programming language used, i.e. Java in the preferred embodiment.

At following step S43, a renaming procedure is performed. The renaming procedure according to the invention relies on the information contained in the reconciliation annotations, within the model entity identification and name fields, and on the predefined renaming rule coded in the code generation component (150) and delivered as input parameter to the reconciliation component (151).

More specifically, the renaming procedure is performed through the following consecutive operations.

Firstly, for each node ("current node") of the tree ("current tree") representing the current source code version, the information items contained in the associated model entity identification and name fields are extracted.

Next, the tree ("new tree") representing the source code new version is parsed.

Finally, for each current node, if it is determined that the corresponding information model entity has been renamed, according to the content of the model entity name field associated with the corresponding new node, then the current node is renamed according to the renaming rule.

In practice, a renaming rule is associated with each entity of the information model, and it is to be applied to each node (i.e. language element) associated with the same model entity.

All the nodes associated to a same model entity have the same "inputID" value, that is, the same value coded in the model entity identification field of the reconciliation annotations.

Thus, in the above program example 'EXAMPLE 2', the nodes identified by:
"FIELD::name",
"METHOD::setName(String)void",
"METHOD::getName( )String", have the same inputID: "ID100", as the three of them are related to the same model entity "name" (inputName field).

For example, let us assume that the model entity "name" has been renamed to "identifier" in the information model, with the following example of renaming rule: (SAME+FIRST_UPPER). Then, in the new version of the source code which has been generated from the so-modified information model, the corresponding reconciliation annotations would be: . . .
{"FIELD::identifier","ID100","identifier","NUD","UNMODIFIED"},
{"METHOD:: setIdentifier(String)void","ID100","identifier","ND","UNMODIFIED"},
{"METHOD:: getIdentifier( )String","ID100","identifier","ND","UNMODIFIED"}, . . .

During the renaming procedure (S43), for each new node (of the new version tree), the association (inputID, inputName, renaming rule) will be extracted, and all the current nodes (of the current version tree) having the same inputID value will be renamed according to the renaming rule.

Thus, in the above example, considering the current nodes associated respectively with the following reconciliation information:
{"FIELD::name","ID100","name","NUD","UNMODIFIED"},
{"METHOD::setName(String)void","ID100", "name", "ND","UNMODIFIED"},
{"METHOD::getName( )String","ID100","name","ND", "UNMODIFIED"}, By applying the renaming rule "SAME", that reconciliation information will be changed into:
{"FIELD::identifier","ID100","identifier","NUD","UNMODIFIED"},
{"METHOD::setName(String)void","ID100","identifier", "ND","UNMODIFIED"}, {"METHOD::getName( )String","ID100","identifier", "ND","UNMODIFIED"}, Then, by applying the renaming rule "FIRST_UPPER", the following (already partly renamed) reconciliation information:

{"METHOD:: setName(String)void","ID100","identifier", "ND","UNMODIFIED"},
{"METHOD:: getName( )String","ID100","identifier", "ND", "UNMODIFIED"}, will be further changed into:

{"METHOD:: setIdentifier(String)void", "ID100", "identifier", "ND", "UNMODIFIED"},
{"METHOD::getIdentifier ( )String", "ID100", "identifier", "ND", "UNMODIFIED"}, Therefore, the renaming procedure is aimed at putting into conformity the naming of the nodes of the current source code version tree with the naming of the nodes of the new source code version tree (further to a renaming of some entities of the model information), so that, for each current node, a unique new node can be determined for the purpose of reconciliation, as will be explained hereinafter.

Returning to FIG. 4, after the renaming process is complete (S43), at step S44, there is determined for each current node, a corresponding new node, if it exists, and the reconciliation annotations are read for both nodes.

Then, at step S45, for each current node, a reconciled node is determined according to the modification state of the current node and either to the modification rule of the corresponding new node if it exists, or otherwise, to the modification rule of the current node.

The determination of a reconciled node is performed by applying a number of predefined reconciliation rules 30 which are pre-configured in the reconciliation component 151.

According to a preferred embodiment of the invention, the reconciliation rules 30 include the following rules (expressed here in a verbal form to facilitate their comprehension:

(a)—if a current node is unmodified and a corresponding new node exists, then the new node is to be used in the reconciled version;

(b)—if a current node is unmodified and a corresponding new node does not exist, then the current node is to be omitted in the reconciled version;

(c)—if a current node has been modified and a corresponding new node exists, and the modification rule is "Not-Updateable-nor-Deleteable" or "Not-Updateable", then the new node is to be used in the reconciled version;

(d)—if a current node has been modified and a corresponding new node exists, and the modification rule is "Not-Deleteable" or "Updateable-and-Deleteable", then the current node is to be used in the reconciled version;

(e)—if a current node has been modified and a corresponding new node does not exist, and the modification rule of the current node is "Not-Updateable-nor-Deleteable" or "Not-Deleteable", then the current node is to be omitted in the reconciled version;

(f)—if a current node has been modified and a corresponding new node does not exist, and the modification rule of the current node is "Not-Updateable" or "Updateable-and-Deleteable", then the current node is to be used in the reconciled version;

(g)—if a current node has been deleted and a corresponding new node exists, and the modification rule is "Not-Updateable-nor-Deleteable" or "Not-Deleteable", then the new node is to be used in the reconciled version;

(h)—if a current node has been deleted and a corresponding new node exists, and the modification rule is "Updateable-and-Deleteable" or "Not-Updateable", then the new node is to be omitted in the reconciled version;

(i)—if a current node has been deleted and a corresponding new node does not exist, then none of them is to be used in the reconciled version;

(j)—if a current node has been added and a corresponding new node exists, and the modification rule is "Not-Updateable-nor-Deleteable" or "Not-Updateable", then the new node is to be used in the reconciled version;

(k)—if a current node has been added and a corresponding new node exists, and the modification rule is "Updateable-and-Deleteable" or "Not-Deleteable", then the current node is to be used in the reconciled version; and (l)—if a current node has been added and a corresponding new node does not exist, then the current node is to be used in the reconciled version.

At step S45, when all the reconciled nodes have been determined, a corresponding tree structure is returned from the reconciliation component (151) at following step S46. The reconciled tree structure returned is a DOM generic tree.

At step S47, this generic reconciled tree is converted into a language specific tree structure. In the preferred implementation, it is a Java-specific JDOM tree. The JDOM reconciled tree is finally converted into Java source code in textual form, and output, for example, as a ".java" file (Java compilation unit).

In order to illustrate the reconciliation process according to the invention, let us assume that the Java code 'EXAMPLE 2' above has been manually modified by a user as follows:

EXAMPLE 2 (MODIFIED SOURCE CODE N')

```
package java.lang.io;
import java.lang.*;
public class Customer {
    private String name;
    public void setName(String sName) {
        name = sName;
    };
    public String getName( ) {
        return name.toUpperCase( );
    };
```

-continued

```
    // each language element is annotated within 5 fields:
    //    "nodeIdentifier",   "inputID",   "inputName",
    "modificationRule",
    // "modificationState"
    public static String[ ] [ ] reconciliationInfos( ) {
        String[ ] [ ] result = {
            {"TYPE::Customer", "ID1", "Customer", "NUD", "UNMODIFIED"},
            {"PACKAGE_DECLARATION::java.lang.io", "ID10", "", "NUD",
"UNMODIFIED"},
            {"IMPORT_CONTAINER::java.lang.*", "ID11", "NUD", "UNMODIFIED"
            },
            {"FIELD::name", "ID100", "name", "NUD", "UNMODIFIED"},
            {"METHOD::setName(String)void", "ID100", "name", "ND",
"UNMODIFIED"
            },
            {"METHOD::getName( )String", "ID100", "name", "ND", "
    MODIFIED"},
        };
        return result;
    }
}
```

As shown above, the language element: method "getName( )" has been modified so as to return the attribute "name" in uppercase. After validation (FIG. 3, S37), the corresponding modification state identification field of the corresponding reconciliation information, has been changed from "UNMODIFIED" into "MODIFIED".

Let us assume now that a new version of the source code given in 'EXAMPLE 2' has been generated due to changes brought to the information model:

EXAMPLE 2 NEW VERSION (SOURCE CODE N+1)

```
package java.lang.io;
import java.lang.*;
public class Customer {
    private String name;
    public String getName( ) {
        return name;
    };
    // each language element is annotated within 5 fields:
    //    "nodeIdentifier",   "inputID",   "inputName",
    "modificationRule",
    // "modificationState"
    public static String[ ] [ ] reconciliationInfos( ) {
        String[ ] [ ] result = {
            {"TYPE::Customer", "ID1", "Customer", "NUD", "UNMODIFIED"},
            {"PACKAGE_DECLARATION::java.lang.io", "ID10", "", "NUD", "UNMODI
            FIED"},
            {"IMPORT_CONTAINER::java.lang.*", "ID11", "", "NUD", "UNMODIFIED"
            },
            {"FIELD::name", "ID100", "name", "NUD", "UNMODIFIED"},
            {"METHOD::getName( )String", "ID100", "name", "ND", "UNMODIFIED
            "},
        };
        return result;
    }
}
```

As shown above, in the new version of 'EXAMPLE 2', the method "setName( )" has been deleted, for example, due to a re-specification of the access to the entity "name" in the information model.

Thus, a reconciled source code obtained after reconciliation of new version (N+1) and current (modified) version (N') of 'EXAMPLE 2' source code, would be as follows.

EXAMPLE 2 (RECONCILED VERSION RECONCILED CODE N+1)

```
package java.lang.io;
import java.lang.*;
public class Customer {
    private String name;
    public String getName( ) {
        return name.toUpperCase( );
    };
    // each language element is annotated within 5 fields:
    //    "nodeIdentifier",  "inputID",  "inputName",
    "modificationRule",
    //    "modificationState"
    public static String[ ] [ ] reconciliationInfos( ) {
        String[ ] [ ] result = {
            {"TYPE::Customer", "ID1", "Customer", "NUD", "UNMODIFIED"},
            {"PACKAGE_DECLARATION::java.lang.io", "ID10", "", "NUD", "UNMODIFIED"},
            {"IMPORT_CONTAINER::java.lang.*", "ID11", "", "NUD", "UNMODIFIED"
            },
            {"FIELD::name", "ID100", "name", "NUD", "UNMODIFIED"},
            {"METHOD::getName( )String", "ID100", "name", "ND", "MODIFIED"},
        };
        return result;
    }
}
```

As shown above, in the reconciled source code, by application of the above-cited reconciliation rule (b) the language element "setName( )" has been omitted in the reconciled source code. Further, by application of the above-cited reconciliation rule (d), the modified language element "getName( )" of the current version has been used in the reconciled version, since the associated modification rule is ND (Not-Deleteable). Finally, the associated modification state has been updated accordingly ("modified").

Figure 5:
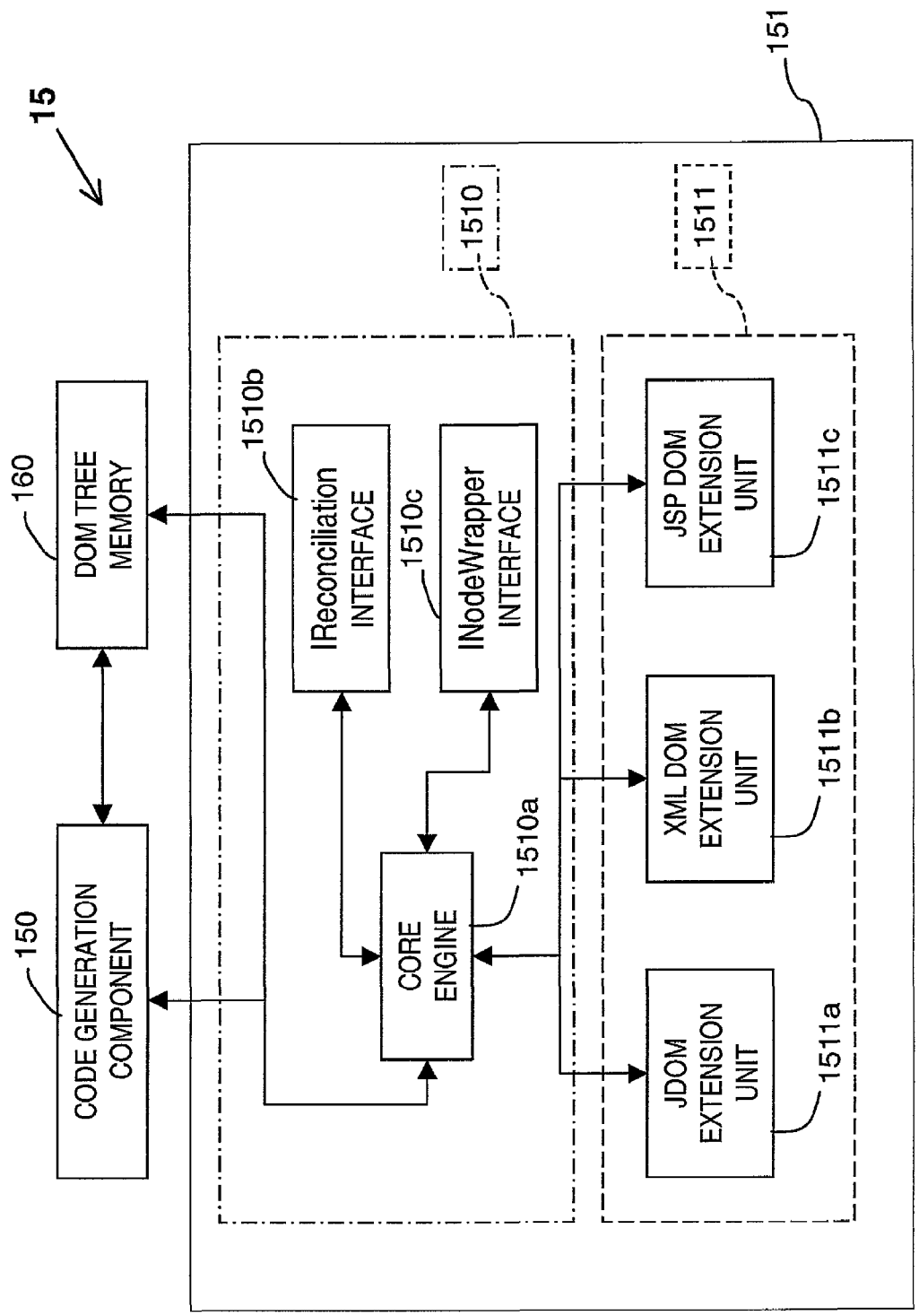
FIG. 5 is a block diagram representing the functional units which make up a source code generation system according to the invention.

With reference to FIG. 5, there will now be described the functional units which make up a source code generation system according to the invention. More particularly, the structure of the reconciliation component (151) will now be detailed.

As shown in FIG. 5, the source code generation system 15 of the invention includes a code generation component 150 for generating program source code as already set out. The code generation component 150 includes means for inserting reconciliation annotations, as defined above, in a program source code, during the generation process.

The system 15 also includes a memory 160 for storing DOM tree representations of source code expressed in a given programming language (Java in a preferred implementation). Memory 160 is, according to a preferred implementation of the invention, made of specific memory locations of a computer RAM, or, as a variant, of a computer hard disk.

DOM trees stored in memory 160 during the code generation process or during the code reconciliation process, represent program source code in a generic tree format, that is, independent of the programming language used.

Finally, the source code generation system 15 of the invention includes a reconciliation component 151 for carrying out a reconciliation process as set out above.

Code generation component 150 and reconciliation component 151 comprise software elements. They are coded in Java language according to a preferred implementation.

Before detailing further the implementation, some basic object oriented (OO) programming and Java principles are explained below.

In OO programming, a class defines a set of objects which are all identical with regard to their structure and their operation. These objects are also referred to as "instances" of the class.

Furthermore, the description of an object comprises two parts:
an "Attribute" part in which are defined all the elementary components (attributes) of an object of the class considered;
a "Method" part in which are defined the functions (methods) which can be applied to the object in order to use it.

In Java, an "interface" is a set of declarations of methods, that is, the information required to call each method (key words and input parameters), without the execution code of the method. A Java interface is intended to be implemented by a Java class.

Returning to FIG. 5, as shown, reconciliation component 151 is made of two sub-units, namely, a Reconciliation Engine 1510 and an Extension Module 1511.

Reconciliation Engine 1510 comprises a "Core Engine" 1510a, and two Java interfaces: "IReconciliation" 1510b and "INodeWrapper" 1510c.

Extension Module 1511 comprises a number of extension units specific to the programming language of the source code(s) to be processed. Thus, JDOM extension unit 1511a is specific to Java language and supports JDOM tree representation. Similarly, XML DOM extension unit 1511b supports XML-DOM tree representation for XML programming language. Lastly, JSP DOM extension unit 1511c supports JSP (JavaServer™ Pages) DOM tree representation for JSP programming language.

Core Engine 1510a

Core Engine 1510a receives as inputs two DOM trees from generation component 150 or from DOM tree memory 160. As already mentioned, these two input trees are generic i.e., independent of the programming language of the corresponding source code versions to be reconciled.

Core Engine 1510a contains the information required for calling the program functions (also designated by "methods") that implement the reconciliation procedures of the invention, that is, the reconciliation procedure, the renaming procedure, and the validation (of user modifications) procedure.

These functions are called through the following declarations expressed in Java:

void reconcile(INodeWrapper wrapper)
    String rename(INodeWrapper wrapper)
    void validate(INodeWrapper wrapper)

It should be noted that, in the implementation described here, the reconcile function automatically calls the rename function.

The three above functions (methods) are called with the input parameter "INodeWrapper" which defines an instance of a class that implements the Java interface INodeWrapper (described later on); "wrapper" defines the internal type of this input parameter. The term "implements" means here that each instance of the class considered contains the execution code of the methods declared in the interface.

IReconciliation Interface 1510b

The IReconciliation Interface 1510b contains the declaration of three categories of Java methods:

1—The declaration of methods which make it possible to actually run the reconciliation or the validation process on language-specific DOM trees such as JDOM trees. For example:

Object reconcile (Object currentNodes, Object newNodes)
    Object validate(Object oldNodes, Object currentNodes)

The aim of each of the above-defined methods is self-explanatory.

2—The declaration of methods which enable the code generation component 150 to provide the Reconciliation Engine (1510) with the reconciliation information associated with each node of a given DOM tree, or which enable the code generation component to allocate some reconciliation information to a given node. For example:

void setNodeUpdateRule(Object node, String updateRule)
    void setNodeInputID(Object node, String inputID)
    void setNodeUpdateState(Object node, String nodeUpdateState)
    void setInputName(String inputID, String inputName)
    String getInputName(String inputID)

The aim of each of the above-defined methods is self-explanatory.

3—The declaration of methods which enable the Reconciliation Engine to modify the content of a DOM tree, in particular by adding or deleting a node, or by replacing it with another. For example:

void addNode(Object parentNode, Object node)
    void deleteNode(Object node)
    void replaceNode(Object node, Object oldNode)

The aim of each of the above-defined methods is self-explanatory.

INodeWrapper Interface 1510c

The INodeWrapper Interface 1510c contains the declaration of two categories of Java methods:

1—The declaration of methods which enable the Reconciliation Engine to consult the information items associated to a given DOM tree node. For example:

String getUpdateRule( )
    String getInputID( )
    String getUpdateState( )
    String getNodedentifier( )
    String getParentNodeIdentifier( )

The aim of each of the above-defined methods is self-explanatory.

2—The declaration of the following methods.

boolean isModified(Object newNode): which enables the detection of a "manual" modification during the validation procedure.
    void rename(String newName): which enables the processing of a node during the renaming procedure.

JDOM Extension Unit 1511a

As each of the extension modules has the same function with regard to the particular programming language of the source code generated, only the JDOM Extension unit 1511a will now be described.

Extension unit 1511a contains two Java classes, herein designated by "JReconciliation" and "JElementWrapper", which implement respectively the IReconciliation Interface (1510b) and the INodeWrapper Interface (1510c). With this implementation, a call of a method declared in the IReconciliation Interface (1510b) or INodeWrapper Interface (1510c) is transformed into a call of a method which is an instance of the JReconciliation or JelementWrapper Java class, and which is dedicated to the JDOM technology.

The entry point of a reconciliation or validation procedure is a method instance of the JReconciliation class, said method being defined as follows.

For the reconciliation procedure:

ICompilationUnit reconcile(ICompilationUnit currentCompilationUnit, ICompilationUnit newCompilationUnit)

For the validation procedure:

ICompilationUnit validate(ICompilationUnit oldCompilationUnit, ICompilationUnit currentCompilationUnit)

Therefore, briefly stated, the reconciliation component (151) includes a so-called "core engine" (1510a) containing information required for calling the program functions which implement the reconciliation procedure, the renaming procedure, and the validation procedure; the core engine being independent of the programming language used for the program source code and of the corresponding dedicated tree structure format.

The reconciliation component (151) further includes:

a first interface (IReconciliation Interface, 1510b) which contains at least information for declaring the methods which make it possible to actually run the reconciliation, the renaming or the validation procedure on language-specific DOM trees.

A second interface (INodeWrapper Interface, 1510c) which contains information for declaring methods which enable the consulting of the information items associated with a given generic tree node, information for declaring a method which enables the detection of a user modification during the course of the validation procedure, and information for declaring a method which enables the processing of a node during the renaming procedure.

Lastly, the reconciliation component (151) includes:

a so-called extension module (1511) which contains a number of extension units (1511a–b), each extension unit (e.g., 1511a) being dedicated to one particular programming language (e.g. Java) supported by the program source code generation system and its corresponding tree structure format, and containing two programming language-specific classes which implement respectively the first (1510b) and second (1510c) interfaces.

Thus, with this software architecture, the same reconciliation engine (1510) can be reused for various DOM technologies, that is, for different programming languages in which is expressed the program source code of a target application generated by the code generation system of the invention.

Figure 6:
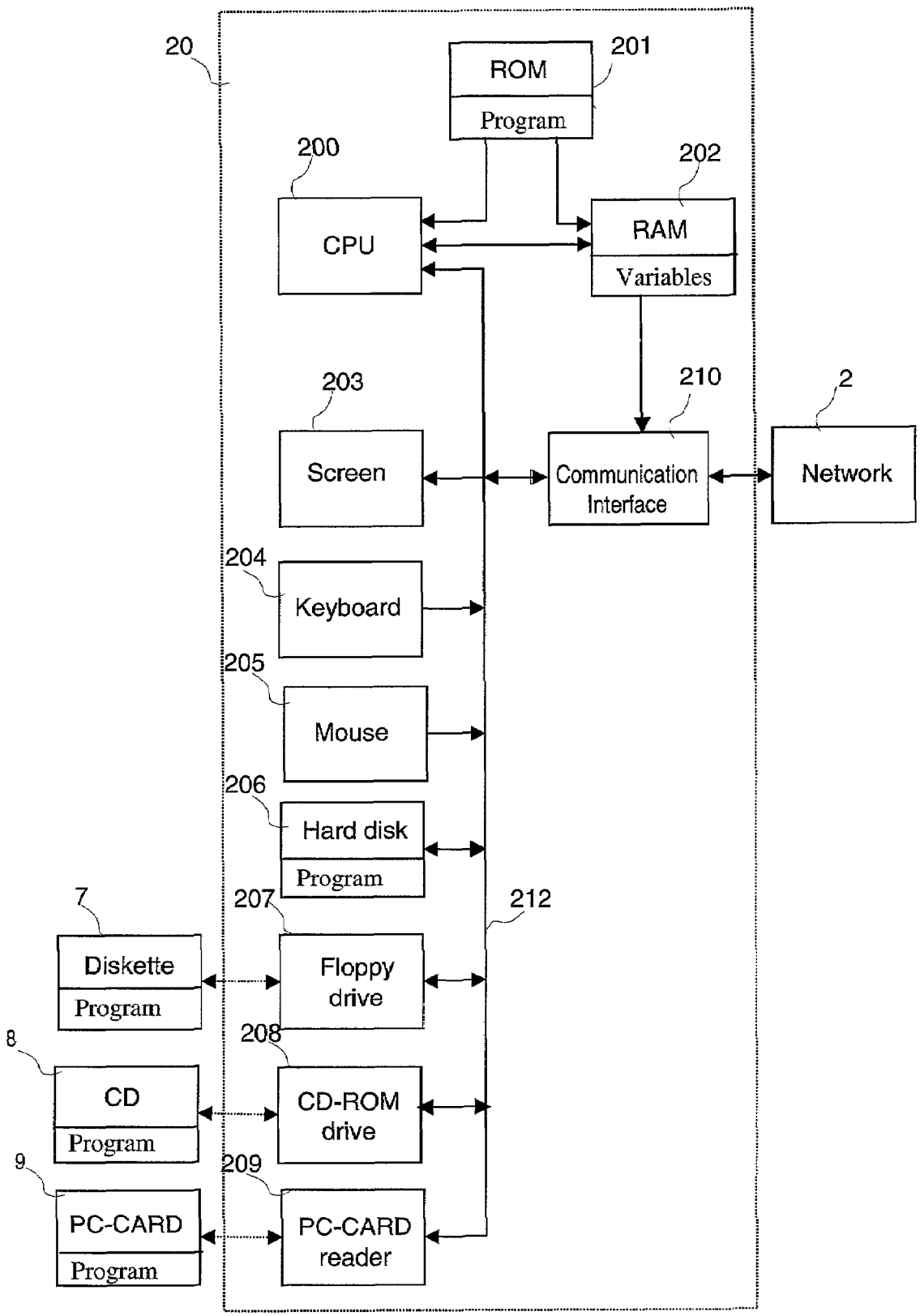
FIG. 6 shows a computer adapted to implement a method of program source code generation according to the invention.

With reference to FIG. 6 a computer (20) adapted to implement a program source code generation method according to the invention will now be described. In other words, this computer incorporates a computer system for generating program source code such as already described with reference to FIG. 5. This computer is for example a micro-computer or workstation.

In this embodiment, the method of source code generation according to the invention is implemented by the execution of a computer program according to the invention loaded in this computer.

The computer 20 comprises in a conventional manner a communication bus 212 to which are connected.

A central processing unit 200 (microprocessor).

A ROM memory 201, in which the executable code of the computer program of the invention can be memorized.

A RAM memory 202, comprising registers adapted to record the variables modified during the course of the execution of the program.

A screen 203 capable of serving as a user interface, with the aid of a keyboard 204 or any other means, for example a mouse 205. This screen may for example enable a user to edit and customize an information model defining a high level specification of a computer application to be generated, as well as to edit a file of Java source code relating to the generated application and modify it.

A hard disk 206, on which, as an alternative to the memory ROM, the executable code of the program according to the invention can be stored. The source code of the program could also be stored on the hard disk and compiled or interpreted in order to be executed.

A floppy drive 207 adapted to receive a diskette 7. The program of the invention stored on a diskette could thus alternatively be loaded onto the computer 20 via the floppy drive 207.

A CD driver 208 adapted to read a CD (compact disk) 8. The program of the invention (source or executable) stored on a CD can thus alternatively be loaded onto the computer 20 via the CD drive 208.

A PC-CARD reader 209 could in the same way enable the program of the invention stored on a PC-CARD 9 to be loaded into the computer.

an interface 210 for communication with a communication network 2 enabling the source code generation program of the invention to be downloaded from another computer system on the network.

It should be noted, on the one hand, that the communication bus 212 allows communication to be made between the different elements included in the computer 20 or linked to it, and on the other hand, that the representation of the bus is not limiting, and, in particular, that the central processing unit (200) is capable of communicating instructions to any element of the computer 20 either directly or by means of another element of the computer.

In brief, the invention described here relates to a method and system for generating program source code of a computer application from an information model representing a high level specification of the computer application.

According to a preferred embodiment, the steps of a method according to the invention are determined by the instructions of a computer program of software source code generation, and the method is carried out when the program is loaded into a computer of which the operation is then controlled by the execution of that program.

As a result, the invention also applies to a computer program, particularly a computer program on or in an information carrier, adapted to implement the invention. The program can use any programming language, and be in the form of source code, object code, or code that is intermediate between source and object code as in a partially compiled form, or in any other form desired to implement a method according to the invention. The information carrier can be any entity or device capable of storing the program.

For example, the carrier may comprise a storage means, such as a ROM, for example a CD-ROM or a semi-conductor ROM, or a magnetic recording means, for example a diskette (floppy disk) or a hard disk. Furthermore, the carrier can be a transmissible carrier such as an electrical or optical signal, which can be routed via an electrical or optical cable, or else by radio or other means.

Alternatively, the carrier can be an integrated circuit in which the program is incorporated, the circuit being adapted to run the method in question, or to be used in the performance of the method.

Persons skilled in the art will recognise that many variations of the teachings of this invention can be made that still fall within the claims of this invention which follow. In particular, the invention is not limited to a computer application generated from a high level information model. On the contrary, the scope of the invention also encompasses all program source code generation schemes where a preceding generated source code version further modified is to be reconciled with a new generated version of the source code.

The invention claimed is:

1. A method in a computer system for generating program source code of a computer application from an information model representing a high level specification of the computer application, said method comprising the computer-implemented steps of:

inserting reconciliation annotations in said program source code, said reconciliation annotations representing at least a modification rule and a modification state for each language element contained in said generated source code;

upon receiving a current version of said program source code, said current version resulting from the modification by a user of an old generated version of said program source code, and a new generated version of said program source code, said new version reflecting changes in the application information model, reconciling the current version with the new version of the program source code according to the reconciliation annotations inserted in each of the current and new program source code versions; and generating a reconciled version of the program source code, whereby user modifications in an old version of the program source code and subsequent changes in the application information model are automatically consolidated in a reconciled version of the program source code.

2. A method according to claim 1, wherein each of the program source code versions is represented by a program tree in a memory of the computer system, the program tree being a tree data structure having nodes, each node representing a language element of the program source code.

3. A method according to claim 2, wherein the step of inserting reconciliation annotations in a generated program source code comprises the step of creating in the program source code, for each node of the program tree representing the program source code, a program construct having a plurality of data fields, said plurality of data fields including:

a node identification field containing a node identifier for identifying the semantic type and the name of the source code language element corresponding to the free node;

a modification rule identification field for containing an identifier of the modification rule applicable to the corresponding language element; and a modification state identification field for containing an identifier indicative of the modification state of the corresponding language element.

4. A method according to claim 3, wherein said plurality of data fields further includes:

a model entity identification field for containing an identifier of an entity of the information model, on which depends the corresponding language element, said entity identifier being invariable all through the code generation process; and a model entity name identification field for containing the name of the information model entity on which depends the corresponding language element, said model entity and identification fields being used in conjunction to a predefined renaming rule for implementing a renaming procedure.

5. A method according to claim 4, wherein the modification rule identified by the value of said modification rule identification field, has one of the following meanings:

the language element to which it applies is not allowed to be modified (Not Updateable—NU);

the language element to which it applies is not allowed to be deleted (Not Deleteable—ND);

the language element to which it applies is not allowed to be modified nor deleted (Not Updateable nor Deleteable—NUD); or the language element to which it applies can be modified or deleted (UD).

6. A method according to claim 5, wherein the modification state identified by the value of said modification state identification field, has one of the following meanings:

the language element to which it applies has not been modified (Unmodified);

the language element to which it applies has been modified (Modified); or the language element to which it applies has been deleted (Deleted).

7. A method according to claim 6, wherein said reconciliation step between said current version and said new version of the program source code, comprises the sub-steps of:

for each node (current node) of the current version free, reading the reconciliation annotations of the current node and those of the corresponding node (new node), if it exists, of the new version tree; and determining a reconciled node according to the modification state of the current node and either to the modification rule of the corresponding new node, if it exists, or otherwise, to the modification rule of the current node.

8. A method according to claim 7, wherein, in order to generate the reconciled version of the program source code, each reconciled node is determilned by applying a number of predefined reconciliation rules which include at least the following rules:

if a current node is unmodified and a corresponding new node exists, then the new node is to be used in the reconciled version;

if a current node is unmodified and a corresponding new node does not exist, then the current node is to be omitted in the reconciled version;

if a current node has been modified and a corresponding new node exists, and the modification rule is "Not-updateable-nor-Deleteable" or "Not-Updateable", then the new node is to be used in the reconciled version;

if a current node has been modified and a corresponding new node exists, and the modification rule is "Not-Deleteable" or "Updateable-and-Deleteable", then the current node is to be used in the reconciled version;

if a current node has been modified and a corresponding new node does not exist, and the modification rule of the current node is "Not-Updateable-nor-Deleteable" or "Not-Deteteable", then the current node is to be omitted in the reconciled version;

if a current node has been modified and a corresponding new node does not exist, and the modification rule of the current node is "Not-Updateable" or "Updateable-and-Deleteable", then the current node is to be used in the reconciled version;

if a current node has been deleted and a corresponding new node exists, and the modification rule is "Not-Updateable-nor-Deleteable" or "Not-Deleteable", then the new node is to be used in the reconciled version;

if a current node has been deleted and a corresponding new node exists, and the modification rule is "Updateable-and-Deleteable" or "Not-Updateable", then the new node is to be omitted in the reconciled version;

if a current node has been deleted and a corresponding new node does not exist, then none of them is to be used in the reconciled version;

if a current node has been added and a corresponding new node exists, and the modification rule is "Not-Updateable-nor-Deleteable" or "Not-Updateable", then the new node is to be used in the reconciled version;

if a current node has been added and a corresponding new node exists, and the modification rule is "Updateable-and-Deleteable" or "Not-Deleteable", then the current node is to be used in the reconciled version; and if a current node has been added and a corresponding, new node does not exist, then the current node is to be used in the reconciled version.

9. A method according to claim 8, wherein the reconciliation step includes a renaming procedure which relics on the information contained in said reconciliation annotations, within said model entity identification and name fields, and on a predefined renaming rule, said renaming procedure comprising the sub-steps of:

extracting from the program source code current version tree ("current tree"), for each current node, the information contained in said model entity identification and name fields;

parsing the program source code new version tree ("new tree"); and for each current node, if it is determined that the corresponding information model entity has been renamed, according to the content of the model entity name field associated with the corresponding new node, then renaming the current node, according to the renaming rule.

10. A method according to claim 9, wherein the reconciliation step is preceded by a step of validating, in said current version of said program source code, the modifications made by the user to said old generated version of the program source code, said validation step comprising, for each modification found into said current version, the substeps of:

reading the modification rule annotation in the old version, which corresponds to the same tree node:

canceling any modification in the current version that violates the corresponding modification rule in the old version, or otherwise; and allowing the modification and updating accordingly the reconciliation annotations contained in the current version, in particular the modification state annotation.

11. A method according to claim 10, wherein a program source code is expressed in Java programming language and the corresponding program tree is structured according to the JDOM (Java Document Object Model) standardized format.

12. A method according to claim 11, wherein said program construct having a plurality of fields containing reconciliation information, is implemented as a specific Java method.

13. A method according to claim 10, wherein a program source code is expressed in XML or HTML programming language and the corresponding program tree is structured according to the DOM (Document Object Model) standardized format.

14. A system for generating program source code of a computer application by carrying out a method as claimed in any one of the preceding claims, said computer system comprising:

insertion means for inserting reconciliation annotations in said program source code during the generation process, said reconciliation annotations representing at least a modification rule and a modification state for eaeh language element contained in said generated source code; and a reconciliation component including:

means for receiving a current version of said program source code, said current version resulting from the modification by a user of an old generated version of said program source code, and a new generated version of said program source code, said new version reflecting changes in the application information model; and means for reconciling said current version with said new version of the program source code according to the reconciliation annotations inserted in each of the current and new program source code versions; and means for generating a reconciled version of the program source code;

whereby user modifications in an old version of the program source code and subsequent changes in the application information model are automatically consolidated in a reconciled version of the program source code.

15. A system for generating program source code of a computer application comprising:

insertion means for inserting reconciliation annotations in said program source code during a generation process, said reconciliation annotations representing at least a modification rule and a modification state for each language element contained in said generated source code; and a reconciliation component including:

means for receiving a current version of said program source code, said current version resulting from the modification by a user of an old generated version of said program source code, and a new generated version of said program source code, said new version reflecting changes in the application information model;

means for reconciling said current version with said new version of the program source code according to the reconciliation annotations inserted in each of the current and new program source code versions;

means for generating a reconciled version of the program source code, whereby user modifications in an old version of the program source code and subsequent changes in the application information model are automatically consolidated in a reconciled version of the program source code;

a core engine containing information required for calling program functions which implement the reconciliation procedure, a renaming procedure, and a validation procedure, the core engine being independent of the programming language used for the program source code and independent of a corresponding dedicated tree structure format;

a first interface containing at least information for declaring the methods which make it possible to actually run the reconciliation, the renaming or the validation procedure on language-specific Document Object Model (DOM) trees;

a second interface containing information for declaring methods which enable the consulting of the information items associated to a given tree node, information for declaring a method which enables the detection of a user modification during the course of the validation procedure, and information for declaring a method which enables the processing of a node during the renaming procedure; and an extension module containing a number of extension units, each extension unit being dedicated to one particular programming language supported by said program source code generation system and its corresponding tree structure format, each extension unit containing two programming language-specific classes which implement respectively said first and second interfaces.

16. A computer program in a computer readable medium, said program comprising program instructions adapted to implement a method comprising the steps of:

inserting reconciliation annotations in said program source code, said reconciliation annotations representing at least a modification nile and a modification state for each language element contained in said generated source code;

upon receiving a current version of said program source code, said current version resulting from the modification by a user of an old generated version of said program source code, and a new generated version of said program source code, said new version reflecting changes in the application information model, reconciling the current version with the new version of the program source code according to the reconciliation annotations inserted in each of the current and new program source code versions; and generating a reconciled version of the program source code, whereby user modifications in an old version of the program source code and subsequent changes in the application information model are automatically consolidated in a reconciled version of the program source code.

17. A productaccording to claim 16, wherein each of the program source code versions is represented by a program tree in a memory of the computer system, the program tree being a tree data structure having nodes, each node representing a language element of the program source code.

18. A product according to claim 17, wherein the step of inserting reconciliation annotations in a generated program source code comprises the step of creating in the program source code, for each node of the program tree representing the program source code, a program construct having a plurality of data fields, said plurality of data fields including:
   a node identification field containing a node identifier for identifying the semantic type and the name of the source code language element corresponding to the tree node;
   a modification rule identification field for containing an identifier of the modification rule applicable to the corresponding language element; and
   a modification state identification field for containing an identifier indicative of the modification state of the corresponding language element.

19. A product according to claim 18, wherein said plurality of data fields further includes:
   a model entity identification field for containing an identifier of an entity of the information model, on which depends the corresponding language element, said entity identifier being invariable all through the code generation process; and
   a model entity name identification field for containing the name of the information model entity on which depends the corresponding language element, said model entity and identification fields being used in conjunction to a predefined renaming rule for implementing a renaming procedure.

20. A product according to claim 19, wherein the modification rule identified by the, value of said modification rule identification field, has one of the following meanings:
   the language element to which it applies is not allowed to be modified (Not Updateable—NU);
   the language element to which it applies is not allowed to be deleted (Not Deleteable—ND);
   the language element to which it applies is not allowed to be modified nor deleted (Not Updateable nor Deleteable—NUD); or
   the language element to which it applies can be modified or deleted (UD).

21. A product according to claim 20, wherein the modification state identified by the value of said modification state identification field, has one of the following meanings:
   the language element to which it applies has not been modified (Unmodified);
   the language element to which it applies has been modified (Modified); or
   the language element to which it applies has been deleted (Deleted).

22. A product according to claim 21, wherein said reconciliation step between said current version and said new version of the program source code, comprises the sub-steps of:
   for each node (current node) of the current version tree, reading the reconciliation annotations of the current node and those of the corresponding node (new node), if it exists, of the new version tree; and
   determining a reconciled node according to the modification state of the current node and either to the modification rule of the corresponding new node, if it exists, or otherwise, to the modification rule of the current node.

23. A product according to claim 22, wherein, in order to generate the reconciled version of the program source code, each reconciled node is determined by applying a number of predefined reconciliation rules which include at least the following rules:
   if a current node is unmodified and a corresponding new node exists, then the new node is to be used in the reconciled version;
   if a current node is unmodified and a corresponding new node does not exist, then the current node is to be omitted in the reconciled version;
   if a current node has been modified and a corresponding new node exists, and the modification rule is "Not-Updateable-nor-Deleteable" or "Not-Updateable", then the new node is to be used in the reconciled version;
   if a current node has been naodilied and a corresponding new node exists, and the modification rule is "Not-Deleteable" or "Updateable-and-Deleteable", then the current node is to be used in the reconciled version;
   if a current node has been modified and a corresponding new node does not exist, and the modification rule of the current node is "Not-Updateable-nor-Deleteable" or "Not-Deleteable", then the current node is to be omitted in the reconciled version;
   if a current node has been modified and a corresponding new node does not exist, and the modification rule of the current node is "Not-Updateable" or "Up dateable-and-Deleteable", then the current node is to be used in the reconciled version;
   if a current node has been deleted and a corresponding new node exists, and the modification rule is "Not-Updateable-nor-Deleteable" or "Not-Deleteable", then the new node is to be used in the reconciled version;
   if a current node has been deleted and a corresponding new node exists, and the modification rule is "Updateable-and-Deleteable" or "Not-Updateable", then the new node is to be omitted in the reconciled version;
   if a current node has been deleted and a corresponding new node does not exist, then none of them is to be used in the reconciled version;
   if a current node has been added and a corresponding new node exists, and the modification rule is "Not-Updateable-nor-Deleteable" or "Not-Updateable", then the new node is to be used in the reconciled version;
   if a current node has been added and a corresponding new node exists, and the modification rule is "Updateable-and-Deleteable" or "Not-Deleteable", then the current node is to be used in the reconciled version; and
   if a current node has been added and a corresponding new node does not exist, then the current node is to be used in the reconciled version.

24. A product according to claim 23, wherein the reconciliation step includes a renaming procedure which relies on the information contained in said reconciliation annotations, within said model entity identification and name fields, and on a predefined renaming rule, said renaming procedure comprising the sub-steps of:
- extracting from the program source code current version tree ("current free"), for each current node, the information contained in said model entity identification and name fields;
- parsing the program source code new version tree ("new tree"); and
- for each current node, if it is determined that the corresponding information model entity has been renamed, according to the content of the model entity name field associated with the corresponding new node, then renaming the current node, according to the renaming rule.

25. A product according to claim 24, wherein the reconciliation step is preceded by a step of validating, in said current version of said program source code, the modifications made by the user to said old generated version of the program source code, said validation step comprising, for each modification found into said current version, the sub-steps of:
- reading the modification nile annotation in the old version, which corresponds to the same tree node;
- cancelling any modification in the current version that violates the corresponding modification rule in the old version, or otherwise; and
- allowing the modification and updating accordingly the reconciliation annotations contained in the current version, in particular the modification state annotation.

26. A product according to claim 25, wherein a program source code is expressed in Java programming language and the corresponding program tree is structured according to the IDOM (Java Document Object Model) standardized format.

27. A product according to claim 26, wherein said program construct having a plurality of fields containing reconciliation information, is implemented as a specific Java method.

28. A product according to claim 25, wherein a program source code is expressed in XML or HTML programming language and the corresponding program tree is structured according to the DOM (Document Object Model) standardized format.

* * * * *